United States Patent
Datikashvili et al.

(10) Patent No.: US 9,516,215 B1
(45) Date of Patent: Dec. 6, 2016

(54) SYSTEM AND METHOD FOR DETERRING THE ABILITY OF A PERSON TO CAPTURE A SCREEN PRESENTED ON A HANDHELD ELECTRONIC DEVICE

(71) Applicants: Isaac Datikashvili, New York, NY (US); Nigel Brady, Hollis, NY (US)

(72) Inventors: Isaac Datikashvili, New York, NY (US); Nigel Brady, Hollis, NY (US)

(*) Notice: Subject to any disclaimer, the term of this patent is extended or adjusted under 35 U.S.C. 154(b) by 32 days.

(21) Appl. No.: 14/488,264

(22) Filed: Sep. 16, 2014

(51) Int. Cl.
*H04N 5/225* (2006.01)
*H04N 5/232* (2006.01)
*G06F 3/0488* (2013.01)

(52) U.S. Cl.
CPC ........ *H04N 5/23216* (2013.01); *G06F 3/0488* (2013.01); *H04N 5/23219* (2013.01)

(58) Field of Classification Search
CPC  H04N 5/225; H04N 5/23216; H04N 5/23219; G06F 3/0488
See application file for complete search history.

(56) References Cited

U.S. PATENT DOCUMENTS

| | | | |
|---|---|---|---|
| 7,359,722 B2 | 4/2008 | Kim et al. | |
| 8,291,026 B2 | 10/2012 | Collins et al. | |
| 9,071,970 B2* | 6/2015 | Okuno | H04M 1/67 |
| 2014/0181689 A1 | 6/2014 | Collins et al. | |
| 2015/0195789 A1* | 7/2015 | Yoon | G06F 3/0488 |
| | | | 345/173 |

* cited by examiner

*Primary Examiner* — Tuan Ho
(74) *Attorney, Agent, or Firm* — LaMorte & Associates P.C.

(57) ABSTRACT

A system that deters an unauthorized person from viewing the image in the display of a handheld electronic device. The handheld electronic device has a touch screen display. A touch security parameter requires a person to repeatedly tap the touch screen display with one or two fingers. The touch screen display will only accurately display an image for as long as the tapping continues. A camera security parameter senses the location of a face in the field of view of a camera. The touch screen display will only accurately show the image for as long as a face is detected in the camera's field of view. A position security parameter detects pitch and yaw with respect to the downward direction of gravity. The touch screen display will only accurately show the image for as long as the display is held within a range of acceptable positions.

9 Claims, 5 Drawing Sheets

SYSTEM AND METHOD FOR DETERRING THE ABILITY OF A PERSON TO CAPTURE A SCREEN PRESENTED ON A HANDHELD ELECTRONIC DEVICE

BACKGROUND OF THE INVENTION

1. Field of the Invention

In general, the present invention relates to software applications that are designed to prevent unauthorized people from capturing information on a screen of a smart phone, tablet, or other handheld electronic device. More particularly, the present invention relates to software applications that prevent selected screens from either being photographed or being captured using a screen shot function.

2. Prior Art Description

Many people communicate using smart phones or other handheld electronic devices. Such devices communicate through a communications network, such as a cellular network or WiFi connections to the World Wide Web.

Often the communications between people involve much more than audible data. Rather, data in the form of pictures, videos, and texts are sent between people. Such communications are visual in nature and are intended to be viewed on the screen of the receiver's device. The problem with sending information that is displayed on a screen is that the sender does not know who will be viewing that information. The screens of smart phones and other handheld electronic devices can be observed by anyone near that device. Furthermore, smart phones and similar devices are often left unattended as they charge. This provides an opportunity for unauthorized users to view private communications.

To complicate matters, many handheld electronic devices, have screen shot functions. The screen shot function is typically activated by pressing one or more of the controls on the handheld electronic device while an image is on the screen of that device. The screen shot function turns the image on the screen into a picture file that can later viewed. Consequently, images in a screen that appear only for an instant can be readily captured.

In the prior art, software applications have been developed for smart phones and other handheld electronic devices that are intended to keep certain communications private. For instance, the SnapChat® software application deletes a communication shortly after it is viewed. Other applications delete communications after certain periods of time. Such software applications are exemplified by U.S. Pat. No. 8,291,026 to Collins; U.S. Pat. No. 7,359,722 to Kim and U.S. Patent Application Publication No. 2014/0181689 to Collins. However, such prior art software application are easily bypassed Software applications that delete expired communications are good. However, they are readily bypassed by using the screen capture function of the handheld electronic device or by simply taking a picture of the screen while a message is being displayed. Consequently, messages that quickly expire can easily be preserved. Furthermore, deleting a sensitive message is not always appropriate. For example, a person might receive a note from a loved one on his/her smart phone. The recipient may not want anyone else to see the note. However, the recipient may also want to keep the note indefinitely and not have it automatically erased.

Other prior art solutions to the problem involve the encryption of communications. Encryption protects a message in transit. However, once a message, image or video is decrypted, that screen can be easily captured or photographed. Consequently, encryption does little to prevent a person from capturing an image that is intended to be viewed only once or only for a short time period.

A need therefore exists for a software application for a smart phone or other handheld electronic device that can deter any displayed screen from being captured or photographed by an unintended or unauthorized people. This need is met by the present invention as described and claimed below.

SUMMARY OF THE INVENTION

The present invention is a system and method that deters a person from capturing the image in the display of a handheld electronic device, such as a smart phone or tablet. The handheld electronic device has a touch screen display. Multiple security parameters are used to ensure the secrecy of any image, such as a text message, email, picture or video, that a user may recall to the touch screen display.

One security parameter is a touch security parameter. This requires a person to repeatedly tap the touch screen display with one or two fingers. The touch screen display will only accurately display an image for as long as the tapping continues. This inhibits a person from being able to take a screen shot of the image being displayed.

Another security parameter is a camera security parameter. If the handheld electronic device comes with a camera that faces in the same direction as the touch screen display, then a subroutine is run that senses the location of a face in the field of view of the camera. The touch screen display will only accurately show the image for as long as a face is detected in the camera's field of view. If the camera is turned away from a face, the image will distort or fade to black.

A third security parameter is a position security parameter. The internal sensors of the handheld electronic device are capable of detecting its pitch and yaw with respect to the downward direction of gravity. If the handheld electronic device is moved outside of a certain predetermined range of acceptable positions, then the image on the display will distort or fade to black.

In combination, the security parameters ensure that only the person holding the handheld electronic device can consistently view an image on the screen. If the image is turned toward another, the image distorts. Likewise, if a person attempts to take a screen shot, the image distorts. Thus, images can be kept safe from conventional capture techniques.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the software application being described can be run on any computing device that has a touch screen display, the embodiment illustrated shows the software being applied to a smart phone. This embodiment is selected in order to set forth the best mode contemplated for the invention. The illustrated embodiment, however, is merely exemplary and should not be considered a limitation when interpreting the scope of the appended claims.

Figure 1:
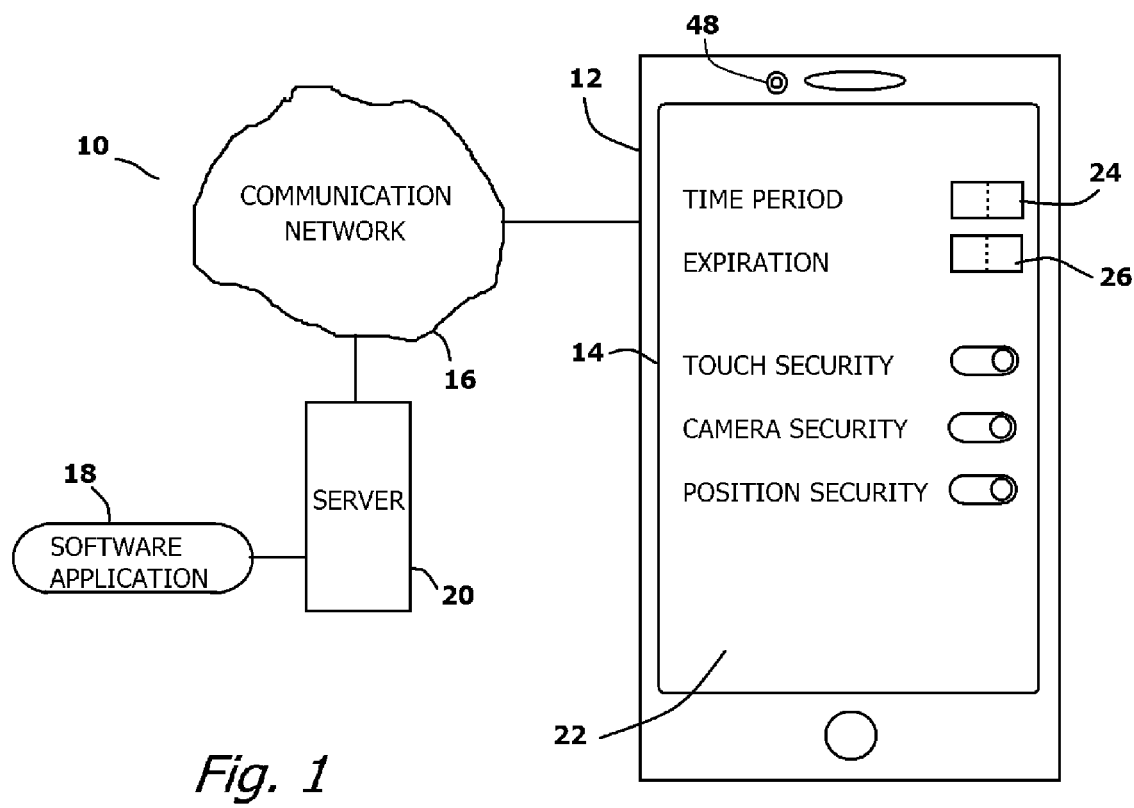
FIG. 1 is a schematic showing the hardware and infrastructure needed to operate the present invention system and method with an administrative screen on a handheld electronic device.

Referring to FIG. 1, the infrastructure and hardware needed to operate the present invention system 10 is shown. A handheld electronic device 12 is provided that has a touch screen display 14. Although a smart phone is illustrated, other handheld electronic devices that run software applications, such as tablet computers, can be substituted provided the handheld electronic device has a touch screen display.

The handheld electronic device 12 is coupled to a communications network 16. The communications network 16 can be either a cellular network or a WiFi connection to the World Wide Web. A software application 18 is downloaded to the handheld electronic device 12 through the communications network 16. The software application 18 is accessed through a server 20 that runs an access port to an on-line store, such as iTunes® or Google Play®.

Once the application software 18 is loaded onto the handheld electronic device 12, it can be selectively run by the user. As can be seen on the touch screen display 14 of FIG. 1, once the software application 18 is run, it presents a user with an administration screen 22. The administration screen 22 enables the user to activate, deactivate, and set values for a variety of security parameters. The security parameters include "expiration", "time period", "touch security", "camera security" and "position security".

The "expiration" security parameter can be selectively activated or deactivated by the user. If deactivated, the "expiration" security parameter has no effect on the functioning of the handheld electronic device 12. Alternatively, if the "expiration" security parameter is activated, a variable field 26 becomes accessible where the user can enter an expiration period. For example, the user can enter two minutes or ten days as the expiration period. The selected expiration period begins the moment the handheld electronic device 12 receives a particular message, picture or video from the communications network 16. The user must then view the message, picture or video within the selected expiration period. If the message, picture or video is not viewed within the selected period of time, then the message, picture or video is automatically deleted so it cannot be recalled.

The "time period" security parameter can be selectively activated or deactivated by the user. If deactivated, the "time period" security parameter has no effect on the functioning of the handheld computing device 12. Alternatively, if the "time period" security parameter is activated, a variable field 24 becomes accessible where the user can enter a time period. For example, the user can enter two seconds or two minutes as the time period. The selected time period begins the moment a user calls a particular message, picture or video to the screen. Once the selected expiration period expires, the selected message, picture or video is automatically deleted so it cannot be recalled. As such, a person must view the message picture or video in the selected time period.

Figure 2:
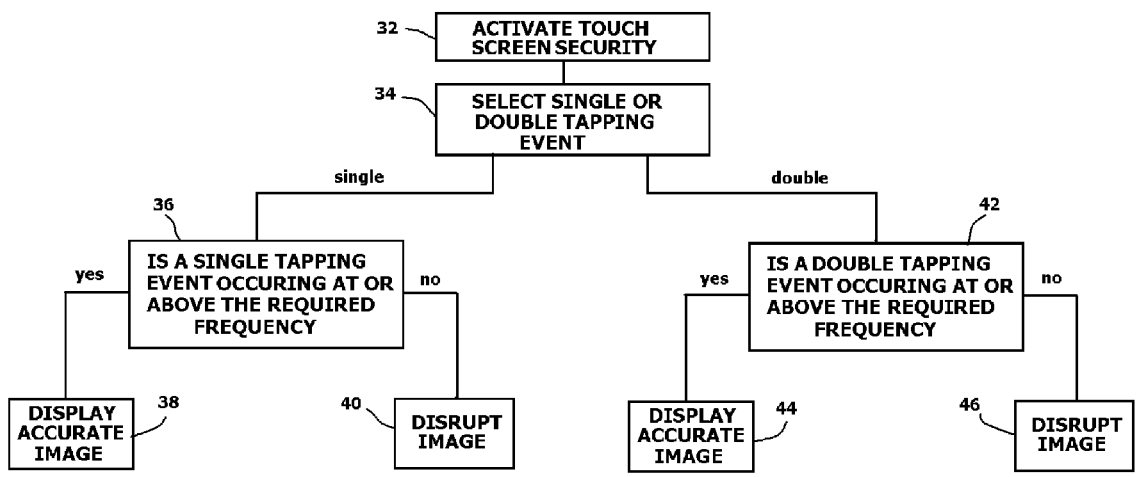
FIG. 2 is a block flow diagram of a touch screen security parameter subroutine.

Referring to FIG. 2 in conjunction with FIG. 1, it can be seen that the "touch security" parameter requires the user to elect between one finger and two fingers. The touch security parameter, if activated, requires a user to continuously tap on the touch screen display 14 in order to see a clear image on the display 14. The continuous tap must be performed at a cycle rate of no longer than one tap every few seconds. The preferred required frequency is at least a few taps every second. If a person stops tapping on the touch screen display 14, then the display 14 goes dark, fades out of focus, or otherwise renders the image on the touch screen display 14 unreadable. These features deter a person from being able to take a screen shot while viewing the message, picture or video on the touch screen display 14. As soon as a person stops tapping the touch screen display 14 to access the screen shot button, the touch screen display 14 will go dark or go out of focus and the screen shot will be ruined.

As is indicated by Block 32 and Block 34, a user activates the touch security parameter and selects either a one finger touch or a two finger touch. If the one finger touch is selected, a user must tap the touch screen display 14 repeatedly with one finger. Thus, there is one tapping event occurring on the touch screen display 14. The tapping event must occur at or over the required tapping frequency. See Block 36. As long as the tapping continues at or above the required frequency, the touch screen display 14 accurately displays the message, picture or video. See Block 38. However, as soon as the tapping stops or becomes inconsistent, the touch screen display 14 goes dark or goes out of focus. See Block 40.

Similarly, if the user elects two fingers, the user must tap the touch screen 14 repeatedly with two fingers. Thus, there are two tapping events occurring simultaneously on the touch screen display 14. The two tapping events must occur at or above the required minimum tapping frequency. See Block 42. As long as both tapping events continue at or above the required frequency, then the touch screen display 14 displays the message, picture or video. See Block 44. However, as soon as one or both of the tapping events stop or becomes inconsistent, the touch screen display 14 goes dark or goes out of focus. See Block 46. The tapping of two fingers inevitably requires a person to hold the electronic device 12 with two hands. This makes it very difficult to press any button required for a screen shot without help from another person.

Figure 3:
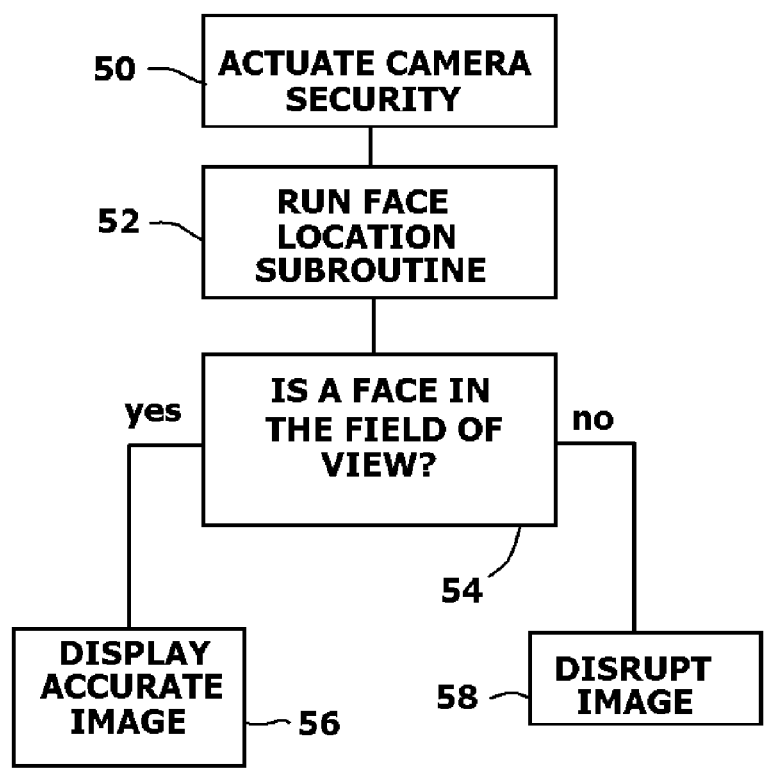
FIG. 3 is a block flow diagram of camera security parameter subroutine.

The "camera security" parameter can also be selected on the administration screen 22. The camera security parameter is used on handheld electronic devices 12 that have integrated cameras 48 that face in the same direction as the touch screen display 14. Referring to FIG. 3 in conjunction with FIG. 1, it can be seen that once activated, the handheld electronic device 12 runs a face location subroutine 52 that identifies the location of any face in the field of view of the camera 48. See Block 50 and Block 52. Many smart phone and tablet computers have such face location subroutines as part of their basic programming package. The face location subroutine enables the camera 48 to locate and automatically focus upon any face as the camera takes a picture or video.

The face location subroutine is used as a trigger to the touch display screen 14. The face location subroutine determines if a face is in the field of view of the camera 48. See Block 54. If the face location subroutine does not identify a face in the field of view of the camera 48, it can be assumed that the handheld electronic device 12 is not being positioned in front of the face of the user. If no face is recognized, the screen goes black or out of focus. See Block 56. Conversely, if a face is located in the field of view, the touch screen display 14 accurately presents the image. See Block 58. Optionally, if the face location subroutine determines that more than one face is in the camera's field of view, then the touch screen display 14 can be made to go black or out of focus.

These features prevent the handheld electronic device 12 from being placed flat on a surface and observed at an angle. It also prevents a person from turning the touch screen display 14 toward another person while a message, picture or video is being displayed. The system prevents a person from positioning a camera or another phone over the touch screen display 14 to image the message, picture or video being displayed. Lastly, by determining if more than one face is present, the security parameter prevents a person from looking over the shoulder of the user to view a screen.

Figure 4:
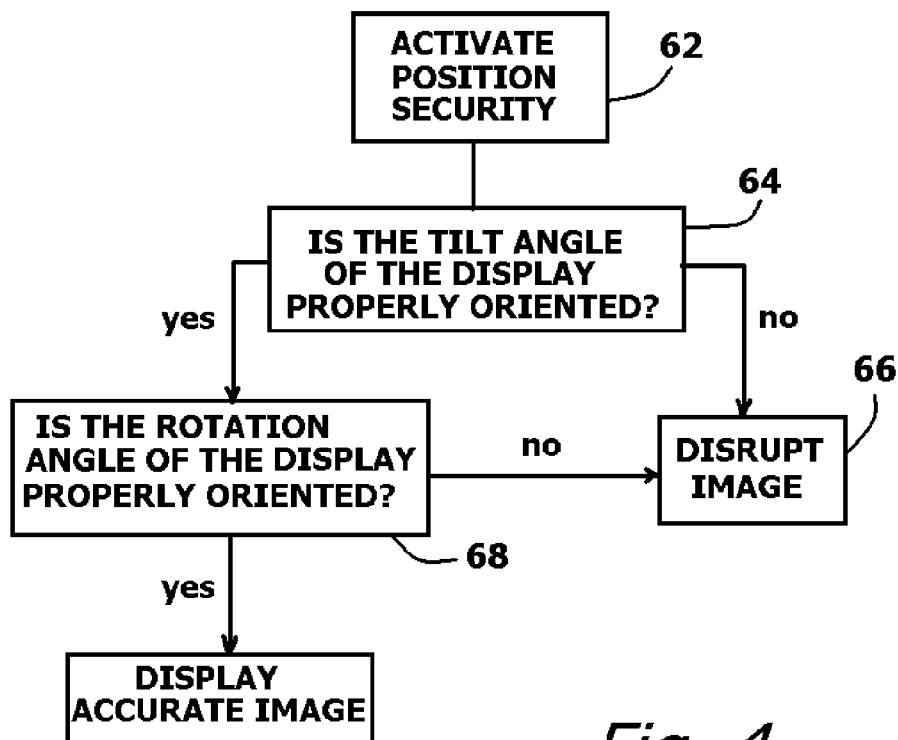
FIG. 4 is a block flow diagram of a position security parameter subroutine.
Figure 5:
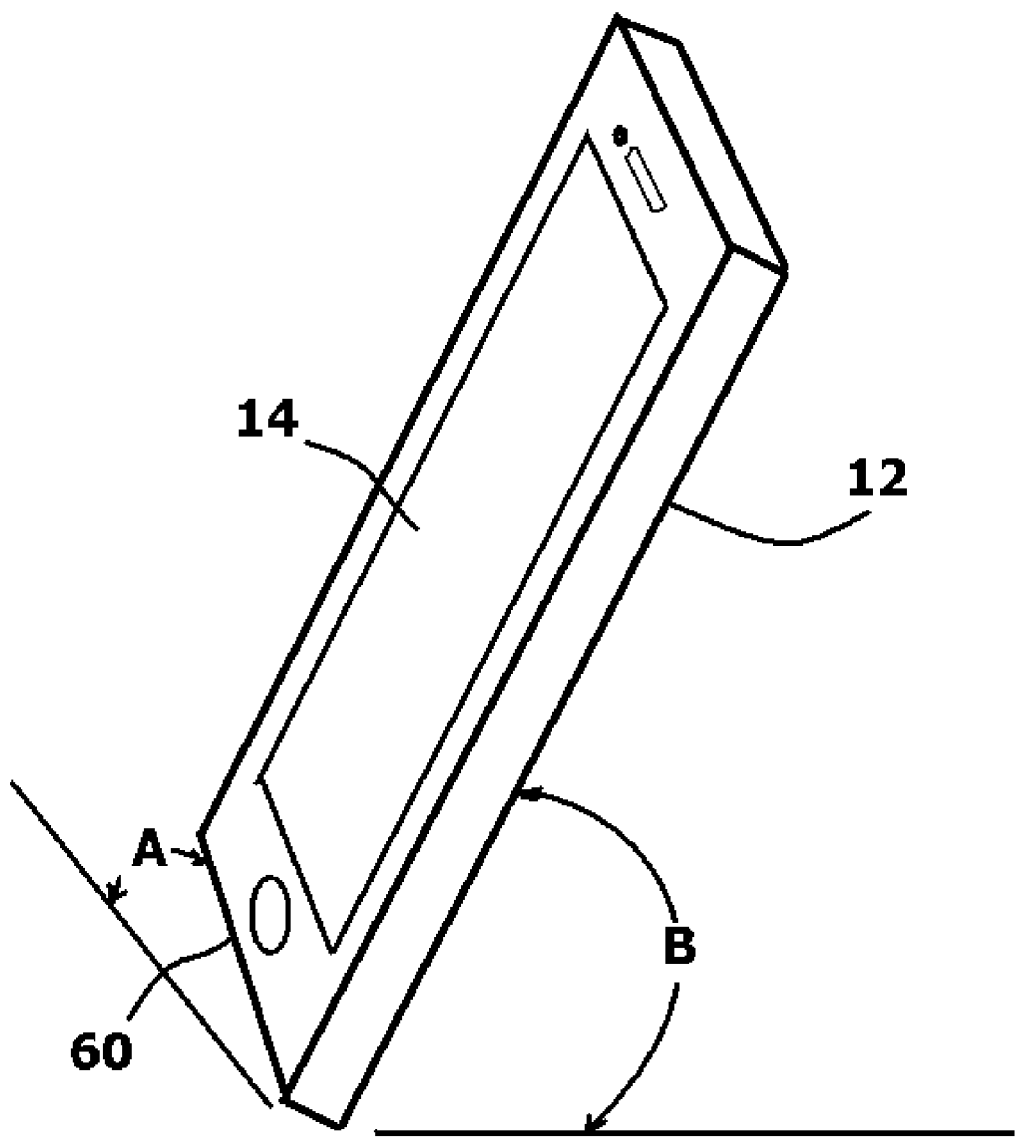
FIG. 5 shows the operational range of the handheld electronic device used with the position security parameter subroutine of FIG. 4.

The final security parameter accessible from the administrative screen 22 is the "position security" parameter. Most modern smart phones and tablets contain internal accelerometers and other such sensors that enable the handheld electronic device 12 to determine its orientation with respect to the downward direction of gravity. Referring to FIG. 4 in conjunction with FIG. 5, it can be seen that the handheld electronic device 12 must be held within a certain orientation range in order to operate properly. Two orientation parameters are monitored. They include the tilt angle "A" of the touch screen display 14 and the rotation angle "B" of the touch screen display 14.

As is indicated by Block 62, the user activates the position security from the administrative screen 22. The touch screen display 14 exists in a fixed plane with peripheral edges that include a bottom edge 60. The preferred orientation positions the touch screen display 14 with its bottom edge 60 in the horizontal plane. If the bottom edge 60 has a tilt angle "A" that is inclined more than a threshold angle away from the horizontal plane, then the image on the touch screen display either goes dark or out of focus. See Block 64 and Block 66. The threshold handle is preferably between thirty degrees and sixty degrees. Likewise, the rotation angle "B" of the touch screen display 14 must remain in a range. The preferred range is between vertical and inclined 30 to 60 degrees from vertical. If the touch screen display 14 is inclined out of this position, the image on the screen either will go dark or will go out of focus. See Block 68 and Block 66. This prevents the handheld electronic device 12 from being placed flat on a horizontal surface where it can be observed by many people at once. Likewise, it deters the handheld electronic device 12 from being positioned in an orientation that can be easily recorded by another camera.

If all of the security parameters are activated, a user would only be able to view an incoming message, picture or video in the following manner. First, due to the "time limit" parameter, an incoming message, picture or video would have to be viewed within the time period selected by the user. To view the message, picture or video, the user would have to hold the touch screen display 14 of the handheld electronic device 12 in front of the user's face. The presence of the user's face would be detected by the "camera security" parameter of the system. The orientation of the touch screen display 14 would be detected by the "position security" parameter of the system. The position in front of the user's face would have to be maintained while the user continuously taps on the touch screen display 14 with either one or two fingers. All the parameters typically require that a person hold the handheld electronic device 12 with two hands. This prevents the user from being able to screen shot images or otherwise orient the touch screen display 14 so that it can be imaged by another device. The results are messages, pictures, and/or videos that can be viewed by the holder of a phone, but are very difficult to be shared with any other person.

It will be understood that the embodiment of the present invention that is illustrated and described is merely exemplary and that a person skilled in the art can make many variations to that embodiment. All such embodiments are intended to be included within the scope of the present invention as defined by the claims.

What is claimed is:

1. In an electronic device having a touch screen display, a method of limiting an image being displayed to a specific time period, therein deterring an unauthorized person from viewing said image on said touch screen display, said method including the steps of:

displaying said image on said touch screen display;

requiring said touch screen display be repeatedly physically tapped with a frequency of at least one tap every few seconds for a period of time while said image is on said touch screen display, wherein said touch screen display accurately displays said image only during said period of time that said touch screen display is being physically tapped.

2. The method according to claim 1, wherein said frequency is at least one tap per second.

3. The method according to claim 1, wherein said step of requiring said touch screen display be repeatedly physically tapped includes requiring said touch screen display be physically tapped with a single repeating tapping event in one area of said touch screen display.

4. The method according to claim 1, wherein said step of requiring said touch screen display be repeatedly physically tapped includes requiring said touch screen display be physically tapped with multiple independent tapping events in different areas of said touch screen display.

5. The method according to claim 1, further including the step of positioning said touch screen display in an orientation range, and accurately displaying said image on said touch screen display only when said touch screen display is in said orientation range.

6. The method according to claim 5, wherein said touch screen display exists in a plane and said orientation range includes when said plane is between vertical and an inclination of between 30 degrees and 60 degrees from vertical.

7. The method according to claim 5, wherein said touch screen display has a bottom edge and said orientation range includes when said bottom edge is between horizontal and an inclination of between 30 degrees and 60 degrees from horizontal.

8. The method according to claim 1, wherein said electronic device contains a camera and software that identifies a location of a face within a field of view being imaged by said camera, wherein said method further includes the step of accurately displaying said image on said touch screen display only while the face is identified within said field of view.

9. In an electronic device having a touch screen display, a camera, and software that identifies a location of a face within a field of view being imaged by said camera, a method of deterring an unauthorized person from viewing an image on said touch screen display, said method including the steps of:

repeatedly tapping said touch screen display with a frequency of at least one tap every few seconds for a period of time, wherein said touch screen display accurately displays said image only during said period of time;

positioning said touch screen display in an orientation range, and accurately displaying said image on said touch screen display only when said touch screen display is in said orientation range;

accurately displaying said image on said touch screen display only while the face is identified within said field of view.

\* \* \* \* \*